(12) United States Patent
Melekian et al.

(10) Patent No.: US 10,001,180 B2
(45) Date of Patent: Jun. 19, 2018

(54) BRAKE ROTOR ASSEMBLY AND A BRAKE ROTOR WEIGHT

(71) Applicant: ArvinMeritor Technology, LLC, Troy, MI (US)

(72) Inventors: Joseph Melekian, Rochester Hills, MI (US); Dana Poquadek, White Lake, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days. days.

(21) Appl. No.: 15/216,732

(22) Filed: Jul. 22, 2016

(65) Prior Publication Data
US 2018/0023642 A1 Jan. 25, 2018

(51) Int. Cl.
*F16D 65/12* (2006.01)
*F16D 65/00* (2006.01)
*F16D 65/02* (2006.01)

(52) U.S. Cl.
CPC ......... *F16D 65/0006* (2013.01); *F16D 65/12* (2013.01); *F16D 65/128* (2013.01); *F16D 2065/1328* (2013.01)

(58) Field of Classification Search
CPC ....... F16D 65/0006; F16D 65/12; F16F 15/32
See application file for complete search history.

(56) References Cited

U.S. PATENT DOCUMENTS

| | | | | |
|---|---|---|---|---|
| 3,368,654 A * | 2/1968 | Burnett | ............... | F16D 65/0006 188/218 A |
| 3,425,523 A * | 2/1969 | Robinette | ........... | F16D 65/0006 188/218 A |
| 3,452,845 A * | 7/1969 | Harmon | .................. | F16D 65/12 188/218 A |
| 3,687,244 A * | 8/1972 | Hillegass | ............ | F16D 65/0006 188/218 A |
| 5,195,236 A | 3/1993 | Miechowicki | | |
| 8,631,578 B2 * | 1/2014 | Glasspoole | ............. | F01D 5/027 29/889 |
| 2015/0285322 A1 * | 10/2015 | Wallmeier | ............ | F16D 65/128 188/218 XL |

FOREIGN PATENT DOCUMENTS

| | | | | |
|---|---|---|---|---|
| DE | 1625675 A1 | 2/1970 | | |
| JP | 61112835 A | * 5/1986 | ............. | F16D 65/12 |
| JP | S6289538 U | 6/1987 | | |

OTHER PUBLICATIONS

European Patent Office, Extended European Search Report for the corresponding European Patent Application No. 17177073.8 dated Dec. 4, 2017.

* cited by examiner

*Primary Examiner* — Bradley T King
(74) *Attorney, Agent, or Firm* — Brooks Kushman P.C.

(57) ABSTRACT

A brake rotor assembly having a brake rotor and a brake rotor weight. The brake rotor weight may be received between vanes of the brake rotor. The brake rotor weight may include a hook arm, a guide arm, and an intermediate portion. The intermediate portion may bias the hook arm in the guide arm against the vanes.

20 Claims, 4 Drawing Sheets

BRAKE ROTOR ASSEMBLY AND A BRAKE ROTOR WEIGHT

TECHNICAL FIELD

This disclosure relates to a brake rotor weight and a brake rotor assembly that may receive the brake rotor weight.

BACKGROUND

A brake disc rotor that receives tapered weights is disclosed in U.S. Pat. No. 5,195,236.

SUMMARY

In at least one embodiment, a brake rotor weight is provided. The brake rotor weight may include a hook arm, a guide arm, and an intermediate portion. The hook arm may have a first end and a second end. A hook may be disposed at the first end. A first bend may be disposed at the second end. The guide arm may be spaced apart from the hook arm. The guide arm may have a first guide arm end and a second guide arm end. A second bend may be disposed at the second guide arm end. The intermediate portion may extend from the first bend to the second bend.

In at least one embodiment, a brake rotor assembly is provided. The brake rotor assembly may include a brake rotor and a brake rotor weight. The brake rotor may have first and second vanes that may extend from a first panel to a second panel of the brake rotor. The brake rotor weight may be received between the first panel and the second panel. The brake rotor weight may be at least partially received between the first vane and the second vane. The brake rotor weight may include a hook arm, a guide arm, and an intermediate portion. The hook arm may extend along the first vane and may have a hook that may extend partially around a first vane end of the first vane. The guide arm may extend along the second vane and may be spaced apart from and may not extend around a vane end of the second vane. The intermediate portion may be disposed between the hook arm and the guide arm. The intermediate portion may bias the hook arm against the first vane and may bias the guide arm against the second vane.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
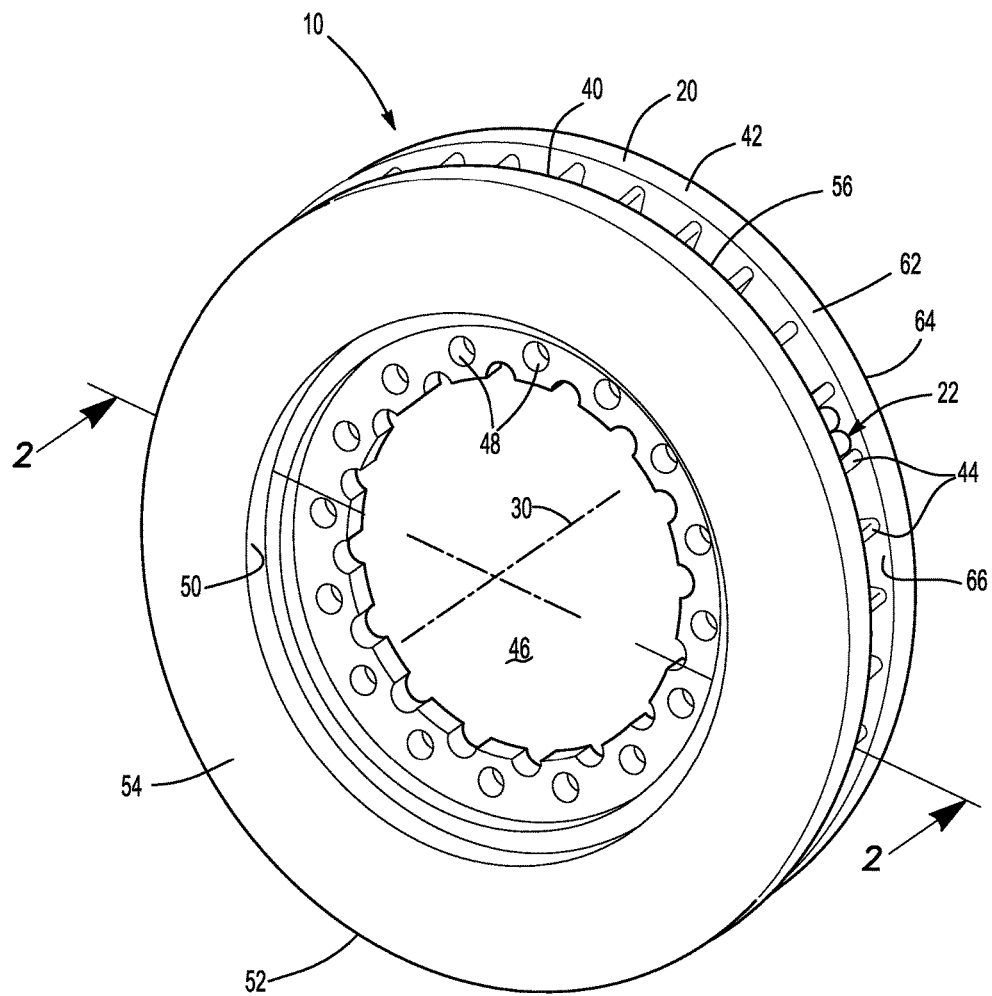
FIG. 1 is a perspective view of a brake rotor assembly having a brake rotor and a brake rotor weight.

Referring to FIG. 1, a brake rotor assembly 10 is shown. The brake rotor assembly 10 may be provided with a motor vehicle like a truck, bus, farm equipment, military transport or weaponry vehicle, or cargo loading equipment for land, air, or marine vessels or a trailer that may be provided with a motor vehicle. More specifically, the brake rotor assembly 10 may be part of a disc brake that may facilitate braking of a vehicle wheel. In at least one embodiment, the brake rotor assembly 10 may include a brake rotor 20 and a brake rotor weight 22.

The brake rotor 20, which may also be called a brake disc, may rotate about an axis 30 with a vehicle wheel and may provide friction surfaces that facilitate braking. The brake rotor 20 may be a unitary or one piece component. In at least one embodiment, the brake rotor 20 may include a first panel 40, a second panel 42, a set of vanes 44, a brake rotor opening 46, and one or more brake rotor mounting holes 48.

The first panel 40 may be configured as a ring that may extend around the axis 30. The first panel 40 may have an inner circumferential surface 50, an outer circumferential surface 52, a first friction surface 54, and a first interior surface 56.

The inner circumferential surface 50 may face toward and may be radially disposed with respect to the axis 30.

The outer circumferential surface 52 may be disposed opposite the inner circumferential surface 50. The outer circumferential surface 52 may face away from the axis 30 and may be radially disposed with respect to the axis 30.

The first friction surface 54 may be engaged by friction material of a brake pad to slow rotation of the brake rotor 20 and an associated wheel about the axis 30. The first friction surface 54 may extend between the inner circumferential surface 50 and the outer circumferential surface 52. The first friction surface 54 may be substantially planar. In addition, the first friction surface 54 may be disposed substantially perpendicular to the axis 30.

The first interior surface 56 may be disposed opposite the first friction surface 54. The first interior surface 56 may face toward the second panel 42.

The second panel 42 may be disposed opposite the first panel 40. The first panel 40 and the second panel 42 may have substantially similar configurations. For instance, the first panel 40 and the second panel 42 may have mirror symmetry with respect to a center plane that may be disposed substantially perpendicular to the axis 30 and that may bisect the brake rotor 20. As such, the second panel 42 may be configured as a ring that may extend around the axis 30 and may have an inner circumferential surface 60, an outer circumferential surface 62, a second friction surface 64, and a second interior surface 66.

Figure 2:
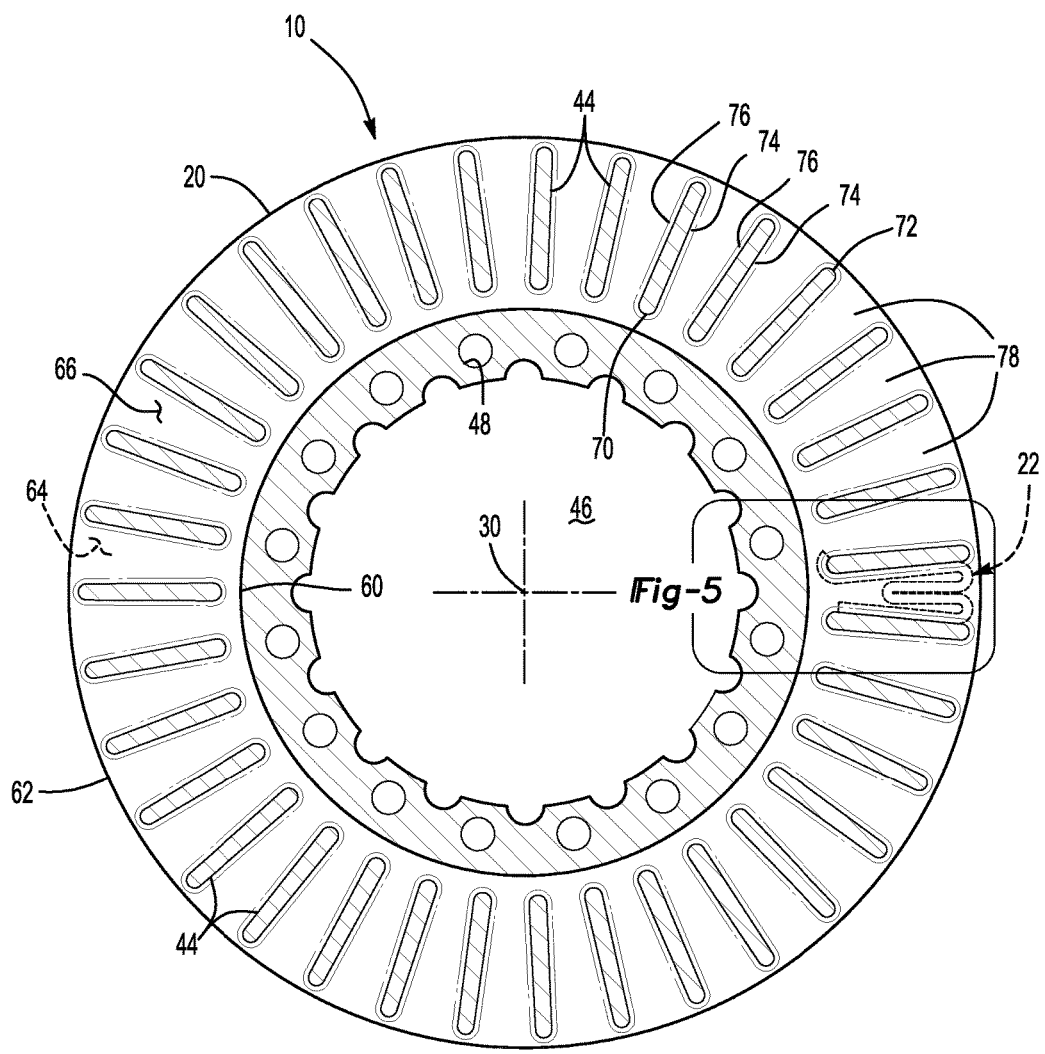
FIG. 2 is a section view of the brake rotor assembly along section line 2-2.

The inner circumferential surface 60, which is best shown in FIG. 2, may face toward and may be radially disposed with respect to the axis 30.

The outer circumferential surface 62 may be disposed opposite the inner circumferential surface 60. The outer circumferential surface 62 may face away from the axis 30 and may be radially disposed with respect to the axis 30.

The second friction surface 64 may be engaged by friction material of another brake pad to slow rotation of the brake rotor 20 and an associated wheel about the axis 30. The second friction surface 64 may extend between the inner circumferential surface 60 and the outer circumferential surface 62. The second friction surface 64 may be substantially planar in may be disposed substantially parallel to the first friction surface 54. In addition, the second friction surface 64 may be disposed substantially perpendicular to the axis 30.

The second interior surface 66 may be disposed opposite the second friction surface 64. The second interior surface 66 may face toward the first interior surface 56 of the first panel 40.

Referring to FIGS. 1 and 2, the set of vanes 44 may extend from the first panel 40 to the second panel 42. More specifically, the vanes 44 may extend from the first interior surface 56 of the first panel 40 to the second interior surface 66 of the second panel 42. The first panel 40 may be spaced apart from and may not engage the second panel 42 in one or more embodiments. The vanes 44, which may also be referred to as fins, 44 may be arranged around the axis 30 and may be spaced apart from each other. The vanes 44 may be radially disposed with respect to the axis 30 and may be positioned between the inner circumferential surfaces 50, 60 and the outer circumferential surfaces 52, 62. As is best shown in FIG. 2, a vane 44 may have a first vane end 70, a second vane end 72, a first vane side 74 and a second vane side 76.

The first vane end 70 may face toward the axis 30. In addition, the first vane end 70 may be offset from the inner circumferential surfaces 50, 60. For example, the first vane end 70 may be disposed further from the axis 30 than the inner circumferential surfaces 50, 60.

The second vane end 72 may be disposed opposite the first vane end 70. The second vane end 72 may face away from the axis 30 and may be offset from the outer circumferential surfaces 52, 62. For example the second vane end 72 may be disposed closer to the axis 30 than the outer circumferential surfaces 52, 62.

The first vane side 74 may extend from the first vane end 70 to the second vane end 72. The first vane side 74 may face toward the second vane side 76 of another vane 44.

The second vane side 76 may be disposed opposite the first vane side 74. The first vane side 74 and the second vane side 76 may be disposed substantially parallel to each other in one or more embodiments.

A gap 78 that may be disposed between adjacent vanes 44. For instance, a gap 78 may be disposed between the first vane side 74 of a first vane 44 and the second vane side 76 of an adjacent second vane 44. A gap 78 may at least partially receive a brake rotor weight 22 as will be discussed in more detail below.

The brake rotor opening 46 may be a through hole that may extend through the brake rotor 20. The brake rotor opening 46 may be disposed proximate the center of the brake rotor 20. The brake rotor opening 46 may receive a portion of a wheel end assembly. For instance, the brake rotor opening 46 may receive a hub that may be rotatable about the axis 30. The hub may be rotatably disposed on another component, such as a spindle. A wheel that supports a tire may be mounted on and coupled to the hub.

One or more brake rotor mounting holes 48 may be provided to facilitate mounting of the brake rotor 20 to the hub. The brake rotor mounting holes 48 may be arranged around the axis 30 and may be disposed between the brake rotor opening 46 and the inner circumferential surfaces 50, 60 of the first and second panels 40, 42. The brake rotor mounting holes 48 may receive corresponding fasteners, such as bolts, that may couple the brake rotor to the hub.

Figure 3:
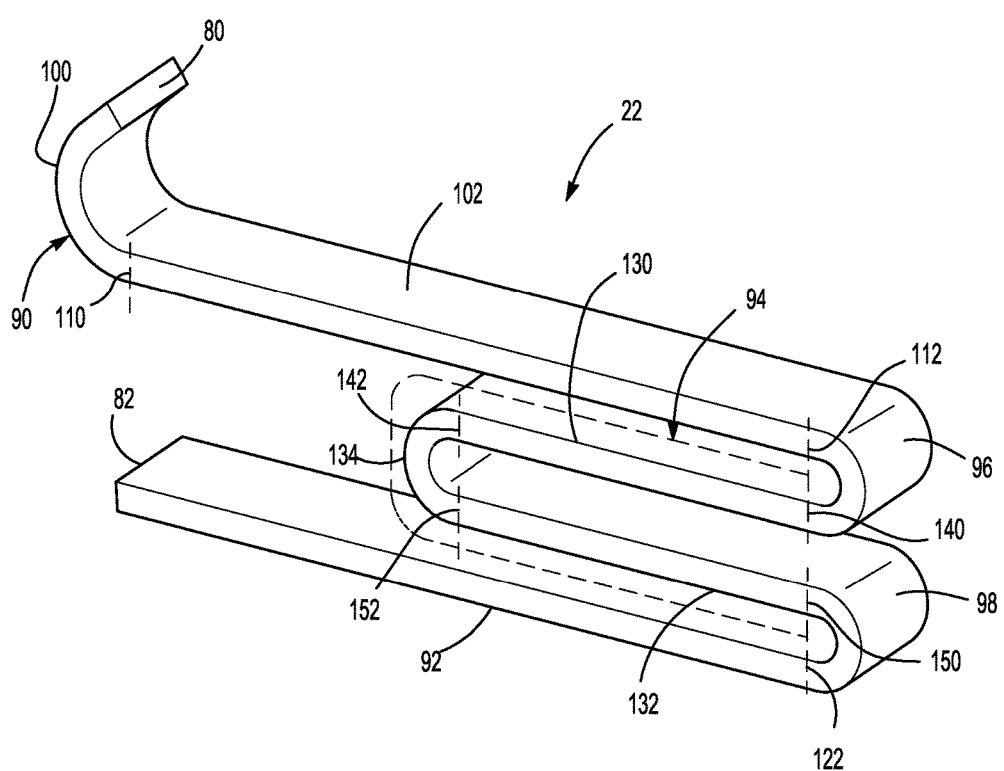
FIG. 3 is a perspective view of the brake rotor weight.

Referring to FIG. 3, the brake rotor weight 22 may provide mass that may help balance the brake rotor 20. More specifically, a brake rotor weight 22 may be inserted into a gap 78 to help address weight imbalances and equalize weight distribution about the axis 30 so that the brake rotor assembly 10 may rotate smoothly. The brake rotor weight 22 may be received in a gap 78 of the brake rotor 20 and may be configured to withstand centrifugal forces and remain in the gap 78 when the brake rotor 20 rotates about the axis 30. Multiple brake rotor weights 22 may be received in different gaps 78 if desired.

The brake rotor weight 22 may have a unitary or one piece configuration. For instance, the brake rotor weight 22 may be made of a single steel strip that may be bent into a predetermined shape and that may extend from a first end 80 or first end surface of the brake rotor weight 22 to a second end 82 or second end surface that may be disposed opposite the first end 80. The predetermined shape may include a serpentine configuration. The steel strip may be heat treated before or after bending the steel strip to provide resilience or spring characteristics. The brake rotor weight 22 may be provided with different masses by varying the thickness of the steel strip. In at least one embodiment, the brake rotor weight 22 may include a hook arm 90, a guide arm 92, an intermediate portion 94, a first bend 96, and a second bend 98.

The hook arm 90 may extend from the first end 80 of the brake rotor weight 22. The hook arm 90 may include a hook 100 and an arm 102.

Figure 5:
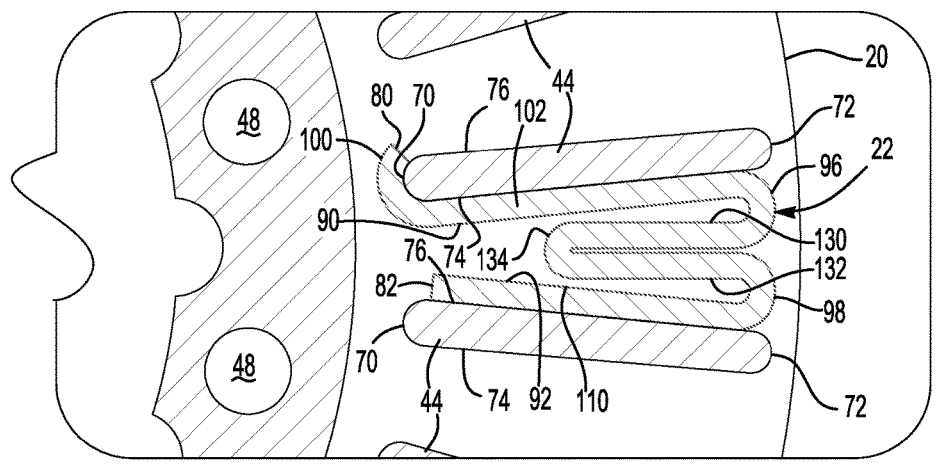
FIG. 5 shows the brake rotor weight fully inserted into the brake rotor.

The hook 100 may extend from the first end 80 of the brake rotor weight 22 to the arm 102. For example, the hook 100 may extend along a curve or an arc in a direction that may extend away from the guide arm 92. As is best shown in FIG. 5, the hook 100 may help secure the brake rotor weight 22 to the brake rotor 20. For instance, the hook 100 may receive and extend at least partially around the first vane end 70 of a vane 44. As such, the hook 100 may help inhibit movement of the brake rotor weight 22 away from the axis 30 in response to centrifugal forces that occur when the brake rotor 20 rotates about the axis 30.

Referring to FIG. 3, the arm 102 may extend from the hook 100 to the first bend 96. For instance, the arm 102 may have a first arm end 110 and a second arm end 112 that may be disposed opposite the first arm end 110. The hook 100 may extend from the first arm end 110. The first bend 96 may extend from the second arm end 112. As such, the hook arm 92 as a whole may extend from a first end (e.g., first end 80) to a second end (e.g., second arm end 112). The arm 102 may be substantially linear in one or more configurations.

The guide arm 92 may extend from the second end 82 of the brake rotor weight 22 to the second bend 98. The guide arm 92 may be spaced apart from the hook arm 90 and may be disposed opposite the hook arm 90. The second end 82 of the brake rotor weight 22 may be a first end of the guide arm 92 or a first guide arm end. The guide arm 92 may also have a second guide arm end 122 that may be disposed opposite the second end 82. The second bend 98 may extend from the second guide arm end 122.

The intermediate portion 94 may be disposed between the hook arm 90 and the guide arm 92. In addition, the intermediate portion 94 may be spaced apart from and may not engage the hook arm 90 and the guide arm 92 when the brake rotor weight 22 is in a nominal position or uninstalled position as shown in FIG. 3 or when the brake rotor weight 22 is not fully inserted in the brake rotor 20. The intermediate portion 94 may extend from the first bend 96 to the second bend 98. The intermediate portion 94 may cooperate with the first bend 96 and the second bend 98 to bias the hook arm 90 and the guide arm 92 against opposing vanes 44 as will be discussed in more detail below. In at least one configuration, the intermediate portion 94 may include a first intermediate arm 130, a second intermediate arm 132, and an intermediate bend 134.

The first intermediate arm 130 may extend from the first bend 96 to the intermediate bend 134. The first intermediate arm 130 may be disposed between the hook arm 90 and the guide arm 92. More specifically, the first intermediate arm 130 may be disposed between the hook arm 90 and the second intermediate arm 132. The first intermediate arm 130 may be substantially linear in one or more embodiments. In addition, the first intermediate arm 130 may be disposed substantially parallel to the guide arm 92, arm 102, second intermediate arm 132, or combinations thereof when the brake rotor weight 22 is in a nominal position or uninstalled position. The first intermediate arm 130 may have a first outer end 140 and a first inner end 142.

The first outer end 140 may face away from the intermediate bend 134. The first bend 96 may extend from the first outer end 140.

The first inner end 142 may be disposed opposite the first bend 96 and the first outer end 140. The intermediate bend 134 may extend from the first inner end 142.

The second intermediate arm 132 may extend from the second bend 98 to the intermediate bend 134. The second intermediate arm 132 may be disposed between the hook arm 90 and the guide arm 92. More specifically, the second intermediate arm 132 may be disposed between the guide arm 92 and the first intermediate arm 130. The second intermediate arm 132 may be substantially linear in one or more embodiments. In addition, the second intermediate arm 132 may be disposed substantially parallel to the guide arm 92, arm 102, first intermediate arm 130, or combinations thereof when the brake rotor weight 22 is in a nominal position or uninstalled position. The second intermediate arm 132 may have a second outer end 150 and a second inner end 152.

The second outer end 150 may face away from the intermediate bend 134. The second bend 98 may extend from the second outer end 150.

The second inner end 152 may be disposed opposite the second bend 98 and the second outer end 150. The intermediate bend 134 may extend from the second inner end 152.

The first intermediate arm 130 and the second intermediate arm 132 may have the same or substantially the same length. The hook arm 90 and the guide arm 92 may be longer than the first intermediate arm 130 and the second intermediate arm 132. In addition, the hook arm 90 may be longer than the guide arm 92 due to the presence of the hook 100.

The intermediate bend 134 may extend from the first intermediate arm 130 to the second intermediate arm 132. More specifically, the intermediate bend 134 may extend from the first inner end 142 of the first intermediate arm 130 to the second inner end 152 of the second intermediate arm 132. As such, the intermediate bend 134 may be disposed opposite the first bend 96 and the second bend 98. The intermediate bend 134 may be disposed between the hook arm 90 and the guide arm 92. Moreover, the intermediate bend 134 may extend along a curve or arc. For instance, the intermediate bend 134 may extend along a 180° arc when the brake rotor weight 22 is in its nominal position. The intermediate bend 134 may be spaced apart from the hook arm 90 and the guide arm 92 when the brake rotor weight 22 is in the nominal position.

The first bend 96 may extend from the hook arm 90 to the intermediate portion 94. More specifically, the first bend 96 may extend from the second arm end 112 of the hook arm 90 to the first outer end 140 of the first intermediate arm 130. The first bend 96 may extend along a curve or arc. For instance, the first bend 96 may extend along a 180° arc when the brake rotor weight 22 is in its nominal position.

The second bend 98 may extend from the guide arm 92 to the intermediate portion 94. More specifically, the second bend 98 may extend from the second guide arm end 122 of the guide arm 92 to the second outer end 150 of the second intermediate arm 132. The second bend 98 may extend along a curve or arc. For instance, the second bend 98 may extend along a 180° arc when the brake rotor weight 22 is in its nominal position. The second bend 98 may be spaced apart from and may not engage the first bend 96.

Figure 4:
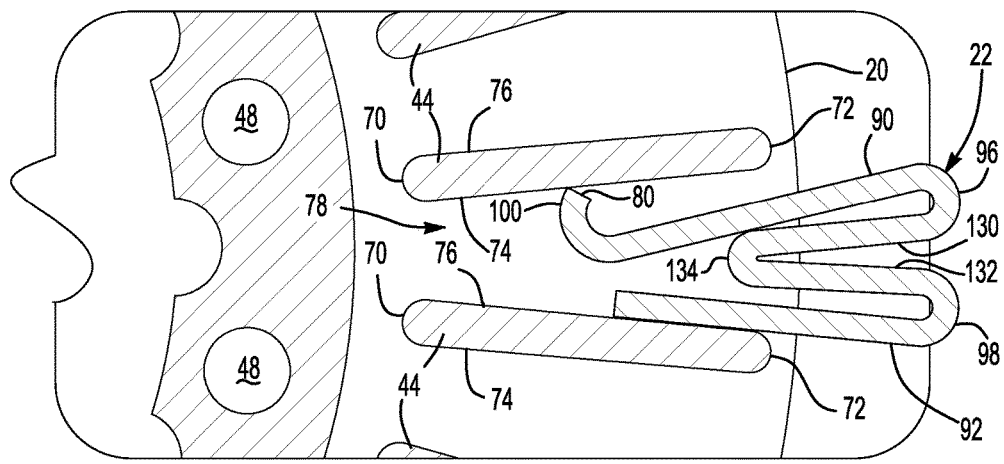
FIG. 4 shows the brake rotor weight partially inserted into the brake rotor.

Referring to FIGS. 4 and 5, installation of the brake rotor weight 22 into the brake rotor 20 is illustrated. The brake rotor weight 22 may be installed by positioning the brake rotor weight 22 into a gap 78 such that the brake rotor weight 22 is positioned between the first panel 40 and the second panel 42 of the brake rotor 20 and between a pair of adjacent vanes 44.

In FIG. 4, the brake rotor weight 22 is shown in a partially installed position. During installation of the brake rotor weight 22, the brake rotor weight 22 may be positioned in the gap 78 between adjacent vanes 44 and inserted in a direction that extends from the outside circumference of the brake rotor 20 toward the axis 30. The hook arm 90 may slide along a first vane 44 while the guide arm 92 may slide along a second vane 44. In FIG. 4, the hook arm 90 is shown in engagement with a first vane side 74 while the guide arm 92 is shown in engagement with a second vane side 76; however, it is contemplated that the hook arm 90 may engage in slide along a second vane side 76 while the guide arm 92 may engage in slide along a first vane side 74 if the brake rotor weight 22 was rotated 180°.

Actuating the brake rotor weight 22 toward the axis 30 may cause the brake rotor weight 22 to flex about the first bend 96, second bend 98, and the intermediate bend 134. For instance, the brake rotor weight 22 may flex about the first bend 96 and the second bend 98 such that the hook arm 90 and the guide arm 92 move closer together and toward the intermediate bend 134 as the hook 100 approaches the first vane end 70. The brake rotor weight 22 may also flex about the intermediate bend 134 such that the first bend 96 and the second bend 98 may move further apart as the hook 100 approaches the first vane end 70. The first intermediate arm 130 and the second intermediate arm 132 may remain disengaged when the brake rotor weight 22 is approaching the fully inserted position.

In FIG. 5, the brake rotor weight 22 is shown in a fully inserted position or installed position. The brake rotor weight 22 may be in the fully inserted position when the hook 100 reaches the first vane end 70 and is free to move away from the guide arm 92 and wrap around and receive at least a portion of the first vane end 70. The arm 102 of the hook arm 90 may extend along and may engage the first vane side 74 of a first vane 44 while the guide arm 92 may extend along and may engage the second vane side 76 of a second vane 44. The guide arm 92 may be disposed in the gap 78 and may be spaced apart from and may not reach the first vane end 70 of the second vane 44. As such, the guide arm 92 may not extend around the first vane end 70 when the brake rotor weight 22 is fully inserted.

In at least one embodiment, the first intermediate arm 130 may be disposed adjacent to the second intermediate arm 132 when the brake rotor weight 22 is in the fully inserted position. Optionally, the first intermediate arm 130 may engage the second intermediate arm 132 when the brake rotor weight 22 is in the fully inserted position. The hook arm 90 and the guide arm 92 may be spaced apart from and may not engage the first intermediate arm 130 and the second intermediate arm 132, respectively.

The intermediate portion 94, first bend 96, and second bend 98 may cooperate to exert a biasing force on the hook arm 90 and the guide arm 92 that may bias the hook arm 90 away from the guide arm 92 to help retain the brake rotor weight 22 to the brake rotor 20.

The configuration of the brake rotor weight 22 may help prevent the brake rotor weight 22 from being inserted too far through the gap 78 or inserted through the gap 78 and positioned too close to the axis 30. For example, movement of the brake rotor weight 22 toward the axis 30 may be inhibited or prevented when the hook arm 90 is squeezed against the first intermediate arm 130 and the guide arm 92 is squeezed against the second intermediate arm 132 due to the non-parallel relationship between adjacent vanes 44. As such, the brake rotor weight 22 may bind up and may not move further toward the axis 30.

The brake rotor weight 22 may provide a durable design that may remain in place even under high centrifugal rotor forces. In addition, the brake rotor weight 22 may be produced from a single piece of material and may be less expensive to produce than a forged or molded brake rotor weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake rotor weight comprising:
a hook arm that has a hook disposed at a first end and a first bend disposed at a second end of the hook arm;
a guide arm that is spaced apart from the hook arm and that has a first guide arm end and a second bend disposed at a second guide arm end, wherein the brake rotor weight extends from the first end to the first guide arm end, the first guide arm end is disposed at an opposite end of the brake rotor weight from the first end, and the guide arm does not have a hook at the first guide arm end; and
an intermediate portion that extends from the first bend to the second bend, the intermediate portion including a first intermediate arm and a second intermediate arm that are disposed between the hook arm and the guide arm, wherein the first intermediate arm extends from the first bend to an intermediate bend.

2. The brake rotor weight of claim 1 wherein the intermediate portion is disposed between the hook arm and the guide arm.

3. The brake rotor weight of claim 1 wherein the first bend is spaced apart from the second bend.

4. The brake rotor weight of claim 1 wherein the intermediate portion is spaced apart from the hook arm and the guide arm between the first bend and the second bend.

5. The brake rotor weight of claim 1 wherein the first intermediate arm is spaced apart from the second intermediate arm.

6. The brake rotor weight of claim 1 wherein the first intermediate arm is spaced apart from the guide arm.

7. The brake rotor weight of claim 1 wherein the second intermediate arm extends from the second bend to the intermediate bend.

8. The brake rotor weight of claim 1 wherein the first intermediate arm is disposed between the hook arm and the second intermediate arm.

9. The brake rotor weight of claim 1 wherein the second intermediate arm is disposed between the guide arm and the first intermediate arm.

10. The brake rotor weight of claim 1 wherein the intermediate bend is disposed between and is spaced apart from the hook arm and the guide arm.

11. The brake rotor weight of claim 1 wherein the intermediate bend is disposed at a first inner end of the first intermediate arm that is disposed opposite the first bend and at a second inner end of the second intermediate arm that is disposed opposite the second bend.

12. The brake rotor weight of claim 1 wherein the hook arm is longer than the guide arm.

13. The brake rotor weight of claim 12 wherein the guide arm is longer than the first intermediate arm and the second intermediate arm.

14. The brake rotor weight of claim 13 wherein the first intermediate arm and the second intermediate arm have substantially the same length.

15. A brake rotor assembly comprising:
a brake rotor that has a brake rotor opening and first and second vanes that extend from a first panel to a second panel, the first and second vanes each having a first vane end that faces toward the brake rotor opening and a second vane end disposed opposite the first vane end; and
a brake rotor weight that is received between the first panel and the second panel and between the first vane and the second vane, the brake rotor weight including:
a hook arm that extends along the first vane and that has a hook that extends partially around the first vane end of the first vane;
a guide arm that extends along the second vane and that is spaced apart from and that does not extend around the first vane end of the second vane; and
an intermediate portion that is disposed between the hook arm and the guide arm, wherein the intermediate portion biases the hook arm against the first vane and biases the guide arm against the second vane.

16. The brake rotor assembly of claim 15 wherein the intermediate portion further comprises a first intermediate arm and a second intermediate arm that are disposed between the hook arm and the guide arm.

17. The brake rotor assembly of claim 16 wherein the brake rotor weight further comprises a first bend that extends from the hook arm to the first intermediate arm, a second bend that extends from the guide arm to the second intermediate arm, and an intermediate bend that extends from the first intermediate arm to the second intermediate arm.

18. The brake rotor assembly of claim 16 wherein the hook arm engages the first vane continuously between the hook and the intermediate portion and the guide arm engages the second vane continuously between a first guide arm end and the intermediate portion.

19. The brake rotor assembly of claim 17 wherein the first intermediate arm engages the second intermediate arm.

20. The brake rotor assembly of claim 17 wherein the hook arm is spaced apart from the first intermediate arm and the guide arm is spaced apart from the second intermediate arm.

* * * * *